US007365649B2

(12) United States Patent
Weitzel

(10) Patent No.: US 7,365,649 B2
(45) Date of Patent: Apr. 29, 2008

(54) SECURITY DEVICE AND METHODS FOR SECURITY DEVICE OPERATION

(76) Inventor: Scott Weitzel, 555 17th St., Suite 3405, Denver, CO (US) 80202

( * ) Notice: Subject to any disclaimer, the term of this patent is extended or adjusted under 35 U.S.C. 154(b) by 203 days.

(21) Appl. No.: 11/330,587

(22) Filed: Jan. 12, 2006

(65) Prior Publication Data

US 2007/0159347 A1 Jul. 12, 2007

(51) Int. Cl.
*G08B 5/36* (2006.01)
*G08B 1/00* (2006.01)
*B60Q 1/124* (2006.01)

(52) U.S. Cl. .......................... 340/815.52; 340/309.16; 362/458

(58) Field of Classification Search .................... None
See application file for complete search history.

(56) References Cited

U.S. PATENT DOCUMENTS 3,787,752 A * 1/1974 Delay ........................ 327/544

* cited by examiner

*Primary Examiner*—Julie Lieu
(74) *Attorney, Agent, or Firm*—Scott Weitzel, Esq.

(57) ABSTRACT

In one embodiment, a security device is disclosed. The device includes 1) a lighting fixture; 2) a number of lighting elements, mounted to the lighting fixture; and 3) a control circuit, programmed to vary the luminosity and duration of the drive currents provided to each of the number of lighting elements, in accord with an algorithm embedded in the control circuit.

18 Claims, 2 Drawing Sheets

SECURITY DEVICE AND METHODS FOR SECURITY DEVICE OPERATION

BACKGROUND

The issue of security is a concern that affects many households and businesses. Deadbolts, security bars, and alarm systems provide means to protect property and deter criminal activity. Other means to deter criminal activity include providing indicators intended to mimic human occupancy, such as by leaving on lights or installation of light timers. Light timers are commonly connected to a lamp and placed in a residence so as to illuminate curtains, walls, or other surfaces visible from the exterior of the structure. The light timers then turn on and off the lamp so as to mimic the actions of a human and hopefully deter criminal activity by placing doubt in the minds of criminals that the residence is unoccupied.

SUMMARY OF THE INVENTION

In one embodiment, a security device is disclosed. The device includes 1) a lighting fixture; 2) a number of lighting elements, mounted to the lighting fixture; and 3) a control circuit, programmed to vary the luminosity and duration of the drive currents provided to each of the number of lighting elements, in accord with an algorithm embedded in the control circuit.

In another embodiment, a method of security device operation is disclosed. The method includes causing the device to illuminate at a luminosity sufficient to illuminate at least one interior surface of a structure in a manner consistent with a television set displaying a television program; and 2) causing the device to illuminate in a varying series of emission stages, wherein at least one of luminosity and color changes between proximate ones of the series of emission stages.

In yet another embodiment, a device for illumination is disclosed. The device includes 1) a means for emitting light at a luminosity sufficient to illuminate at least one interior surface of a structure in a manner consistent with a television set displaying a television program; and 2) a means for varying the emitted light in conformity with the emitted light produced by a television displaying a television program.

Other embodiments are also disclosed.

BRIEF DESCRIPTION OF THE DRAWINGS

Illustrative embodiments of the invention are illustrated in the drawings, in which.

DETAILED DESCRIPTION OF THE INVENTION

Figure 1:
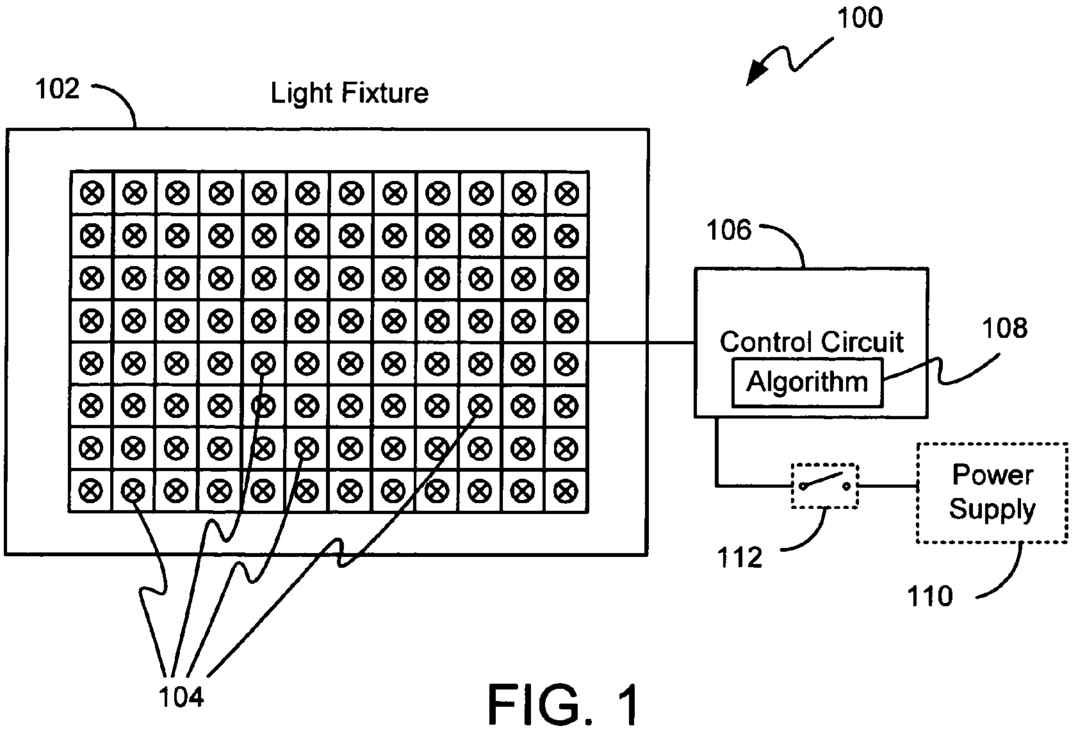
FIG. 1 illustrates one exemplary block diagram of a security device.

One means of indicating human occupancy is by operating a television set at night or at other times when the ambient lighting conditions are generally sufficient to see an illumination caused by an operating television set. The familiar blue flicker of a television set illuminating the walls, windows, curtains, ceilings of a room and/or cracks and peepholes around doors is a common sight especially in the United States residences. Occasionally the television set itself visible but the blue flicker is sufficiently well associated in the minds of modern society as being caused by a television set. Providing a blue flicker that mimics a television set is therefore sufficient to provide a strong indicator of human occupancy. By providing such an illusion of human occupancy, criminal activity may be deterred.

Light sources, such as one or more light emitting diodes (LEDs) can provide a light that mimics the color, intensity, and flicker of a television set without the cost, power consumption, and fear of damage due to a power surge associated with operating an actual television set. As it is extremely difficult to determine what program a television is displaying by the net illumination, a flicker (e.g., color and/or illumination change) with the degree of variance and frequency of variance common to television programs is generally sufficient to convince the typical human observer that the light is originating from an operating television set displaying a television program.

Although a television set may be capable of displaying the full range of colors perceptible to the human eye, the light reflected off of interior surfaces is a bluish color. Short periods of longer wavelengths (e.g., red, green, yellow) may occur but blue is the most prominent. A television is displaying a single color of a longer wavelength (e.g., yellow, red, green) produces an observed light reflecting from typical room surfaces (e.g., wall, ceiling, floor, furniture) that may still be blue shifted, such that emitting yellow may make a room surface appear white and emitting red may make a room surface maroon. This is a result of the color temperature of the net output of the television.

Modern consumer color television sets produce light in three different colors red, green, and blue. However these three colors produce an average color temperature that, for televisions targeted to the United States market, is generally and/or ideally 7,300° Kelvin. Japanese market television sets average 9,300° Kelvin and in Europe the standard is closer to "daylight" at 6500° Kelvin. Black and white televisions sets are becoming rare but also produce a color temperature in this range. However as a television operates by displaying a television program (e.g., broadcast, cable, or satellite programming; DVD or VCR playing a recorded program; certain video games; or similar source of content that causes the net output of the television to flicker) the net output generally ranges from the white ("daylight") 5,500° Kelvin to infinite (e.g., the shortest wavelengths visible to the human eye, the shortest displayable wavelengths) although certain television sets may be limited to 30,000° Kelvin or even less. Certain television sets, displaying certain images (e.g., nearly all red), may approach the red color temperatures, such as 2,000° Kelvin or even lower. However, television programming is most commonly developed with assumption of 7,300° Kelvin, at least in United States markets, as the average television set output color temperature.

Illuminating a room with a flickering red light, without ample inclusion of flickering blue light, is more likely to form in the mind of an observer that a fire exists and not that an operating television exists. While the presence of a fire may deter theft, the consequences of providing a device mimicking a fire, may be significant and undesirable (e.g., good citizen calling the fire department). Similarly, a flickering green, yellow, orange, or other non-blue weighted color is not as readily associated with a television set, unless such colors are inserted within sufficient periods of blue light. Therefore, by causing a light source to emit light with an average color temperature approximating that of a television set, varying the color within a range of color temperatures common to television sets, and with changes in luminosity and/or color to produce a flicker in conformity with the flicker produced by a television set displaying a television program, the light source may mimic the net output of a television set displaying a television program.

As an operating television set is readily associated with human occupancy, the illusion of human occupancy may be provided, such as, by placing the light source in the interior of a structure so as to illuminate an interior surface of the structure, which is observable from the exterior of the structure, in conformity with the observable illumination provided by a television set displaying a television program, and as a benefit, criminal activity may be deterred.

FIG. 1 illustrates one exemplary block diagram of security device 100. Light fixture 102 supports the mounting of a number of lighting elements 104. Light fixture 102 may be a printed circuit board, housing, frame, socket(s), and/or other structure operable to support lighting elements 104. Lighting elements 104 are variously embodied and may include LEDs, incandescent bulbs, florescent tubes, laser, laser diodes, and/or other light sources or combinations thereof. Control circuit 106 is controlled by algorithm 108 and to cause variations in the drive currents to lighting elements 104 to vary the luminosity, duration, and/or color in accord with the instructions of algorithm 108.

In one embodiment, algorithm 108 selects ones of lighting elements 104 and causes the drive current to be applied heterogeneously to ones of lighting elements 104 to produce a target net luminosity of lighting elements 104. For example, if one of lighting elements 104 produces a color temperature of 6,000° Kelvin and another one of lighting elements 104 produces a color temperature of 7,000° Kelvin a combination of both, assuming similar luminosity, is a net color temperature of 6,500° Kelvin.

In a second embodiment, the drive current is applied to a plurality of lighting element 104 and operates the select plurality of lighting elements homogeneously to provide a desired luminosity. In a further embodiment, the select plurality of lighting elements 104 is all lighting elements 104.

In a third embodiment, a target luminosity is determined by algorithm 108, which causes the drive current to be applied to a select number of the ones of lighting elements 104 such that the combination of selected, or not selected, (i.e., powered or not powered) ones of lighting elements 104 provides the desired luminosity.

In a forth embodiment, a target luminosity is determined by algorithm 108, which causes the drive current to be applied to a select plurality of lighting element 104 and operates the select plurality of lighting elements 104 homogeneously to provide the target luminosity. In a further embodiment, the select plurality of lighting elements 104 is all lighting elements 104.

In other embodiments, the duration of the drive currents may be heterogeneously applied to individual ones of lighting elements 104 or to a plurality, which may include all, lighting elements 104. For example, the duration of the drive current may cause the net output of lighting elements 104 to reduce by 50% after 3 seconds. This may be achieved by 1) a drive current that causes half of the operating lighting elements 104 to turn off, 2) causing all of the operating lighting elements 104 to reduce their luminosity by 50%, 3) causing lighting elements 104 to rapidly and proportionately strobe (e.g., 10 milliseconds on and 10 milliseconds off), or 4) a combination thereof. In other embodiments, such as those wherein algorithm 108 considers the optimum operating parameters for ones of lighting elements 104, cutting the net luminosity of lighting elements 104 involves increasing the drive current of a first portion of lighting elements 104 so that a second portion of lighting elements 104 may be shut off or reduced by a greater amount. For example, if one hundred homogeneous lighting elements 104 are producing a first luminosity level and algorithm 108 determines the duration at this output level has expired and the next luminosity stage is to be halved, algorithm 108 then causes the output of twenty five of lighting elements 104 to double and power off seventy-five of lighting elements 104*f*, with the net effect being half of the previous luminosity. However, operating lighting elements 104 in such manner (i.e., to operate ones of lighting elements 104 to operate at discrete output levels) may improve longevity of lighting elements 104 and/or optimize the light output for a given power consumption of device 100, as compared to operating lighting elements 104 through their entire luminosity range.

In one embodiment, algorithm 108 is hard-wired circuit logic. In another embodiment, algorithm 108 is software instructions loaded into volatile memory, such as when control circuit 106 is a general purpose processor. In yet another embodiment, algorithm 108 is "firmware" wherein instructions of the algorithm are in non-volatile memory accessible by control circuit 106. In a further embodiment, algorithm 108 incorporates random generation of duration, color, and/or luminosity.

Algorithm 108 causes control circuit 106 to provide lighting elements 104 with drive currents. In one embodiment, algorithm 108 may be entirely deterministic, that is, a programmed sequence of varying luminosity and duration drive currents result to cause lighting elements 104 to execute a programmed "flicker" wherein luminosity, duration, and/or color vary. Such a program should have a sufficiently long repeat-time as well as illumination stages (i.e., color, duration, and/or luminosity variations) so as to still be in accord with the lighting patterns readily associated with a television displaying a television program. In a second embodiment, algorithm 108 is a random determination engine, that is, a random sequence of varying luminosity and duration drive currents result and cause lighting elements 104 to execute a random "flicker" wherein luminosity, duration, and/or color vary. In a further embodiment, constrains are applied to the random generator (e.g., a random duration that is between 2 and 30 seconds, a random duration between 2 and 30 seconds with half of the durations between 5 and 7 seconds). In a third embodiment, algorithm 108 may be partially deterministic and partially random (e.g., random color, programmed luminosity; random duration, programmed color; user selectable program that may include a "random" program).

In additional embodiments, color is determined by altering the luminosity of color-specific ones of lighting elements 104 and/or the luminosity of various colors of multiple-color ones of lighting elements 104. In another embodiment, one or more of lighting elements 104 produce light of a color temperature with the aide of a color filter.

To better allow device 100 to mimic an operating television set, the changes in luminosity are abrupt. Although certain television programs may include very slow transitions from one scene to the next, the majority of "shots" (e.g., camera angles, scene changes, camera views, et cetera) are instantaneous. For example, a television program in which two people are talking may involve one camera showing one of the parties, another camera showing another of the parties, and a third showing both. As the scene progresses the view shifts instantaneously, as perceived by a human observer, as the display shows the view from one camera to the next. Even if the scene is slowly transitioned to another scene, a viewer of the reflected light from a television set showing such a scene, will notice the "flicker" as caused by those abrupt change in luminosity and/or color caused by the varying camera view changes and readily associate the illumination source as coming from a television set, even if a limited number of illumination stages include gradual transitions. Therefore, in one embodiment, the number of lighting elements 104 undergo a series of abrupt output changes between emission stages, wherein within ones of the emission stage the luminosity and color remain substantially constant. In another embodiment, the abrupt output changes occur instantaneously as perceived by a human observer. In another embodiment, the output changes occur in less than 0.1 seconds. 0.1 seconds is detectible by a careful human observer as not "instantaneous," however, such a short transition would still be generally perceived as instantaneous by a casual human observer and this timeframe is within the expected operating pattern of a television showing a television program.

In another embodiment, the luminosity is varied to cause the luminosity of lighting elements 104 to produce substantially no output. Such a pattern mimics "fade to black" and/or longer scene transitions, such as transitions to commercial breaks. Furthermore, certain television programs will include black scenes (e.g., very dim light, night, et cetera) and, therefore, mimicking such scenes is within the expected operating characteristics of a television showing a television program.

The net output of a television set is dependent on the size, type (e.g., cathode ray tube, plasma, liquid crystal), user settings (e.g., brightness, contrast, color balance), and the television program being displayed. Device 100 has a sufficient output to mimic what would readily be associated as the output of a television set. In a further embodiment, device 100 has an average luminosity and/or color balance level controls so as to enable mimicking the net illumination for a range of televisions, for example, a small portable television to very large plasma displays. In another embodiment, average luminosity and/or color balance of device 100 is determined during manufacture of device 100.

For best efficacy, a user of device 100 would place device 100 in a configuration so that the emitted light will be reflected from a surface that is viewable by potential criminals who may be deterred by evidence of a human occupying the area of device 100. For example, an apartment building may have doors to individual units that allows light to illuminate gaps below or around the door or through peepholes. A low-output device 100 placed in close proximity to the door may provide sufficient illumination to mimic a television set in its normal position within the apartment. In other operating configurations, such as in houses, device 100 may be oriented to illuminate curtains, windows, or surfaces such as walls and ceilings that are visible from the exterior of the house, such as through a window, and may require greater luminosity to sufficiently mimic a television set.

Figure 2:
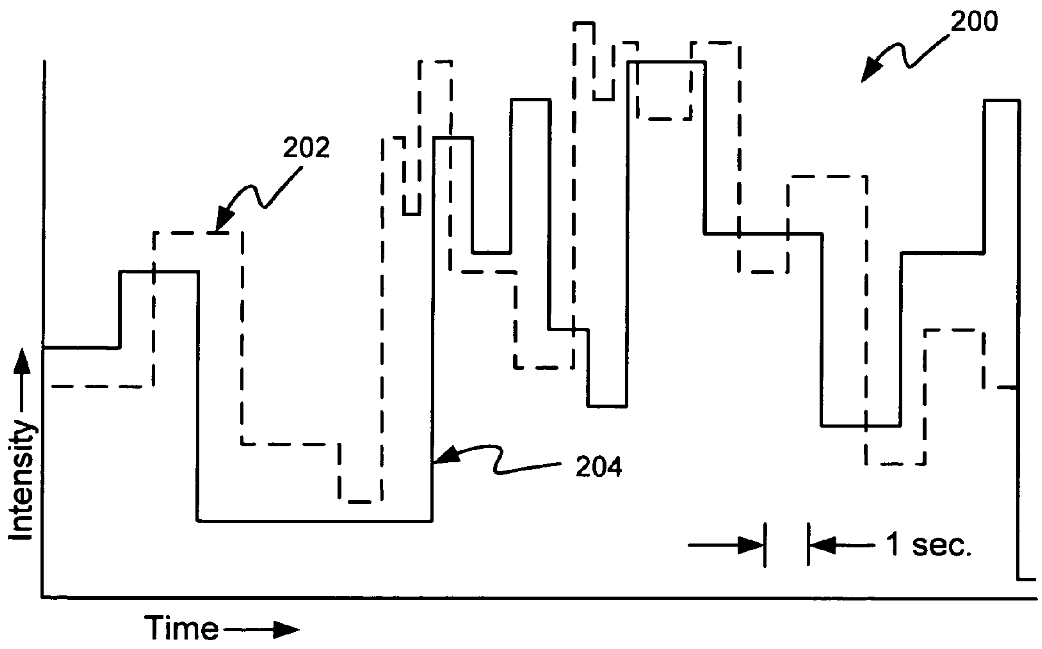
FIG. 2 illustrates one exemplary intensity graphic illustrating color temperature curve and luminosity curve.

FIG. 2 illustrates one exemplary intensity graphic 200 illustrating color temperature curve 202 and luminosity curve 204. Graphic 200 includes stages wherein the color and intensity are consent for several seconds, as well has periods of rapid transition from one stage to the next. In other embodiments, color temperature curve 202 and luminosity curve 204 are synchronized to a greater degree.

Optionally, power supply 110 is included to provide electrical power to control circuit 106 and/or lighting elements 104. Power supply 110 is variously embodied and may include battery power, household current, generators, or other means of producing power. Optionally, power supply 110 provides power to another device (e.g., lamp, radio, compact disk player).

Switch 112 provides a selectable interruption to control circuit 106, lighting elements 104, or both. Switch 112 is variously embodied and may include manual switches, timers, photo sensors, acoustic sensors, and interfaces (e.g., USB, SCSI, infrared, radio frequency) to allow other systems (e.g., personal computers, home automation controllers, remote controls) to selectively control the power from power source 110. Switch 112 is illustrated as between power supply 110 and control circuit 106. In other embodiments, switch 112 may selectively control power applied to power supply 110 and/or to light fixture 102 directly.

Figure 3:
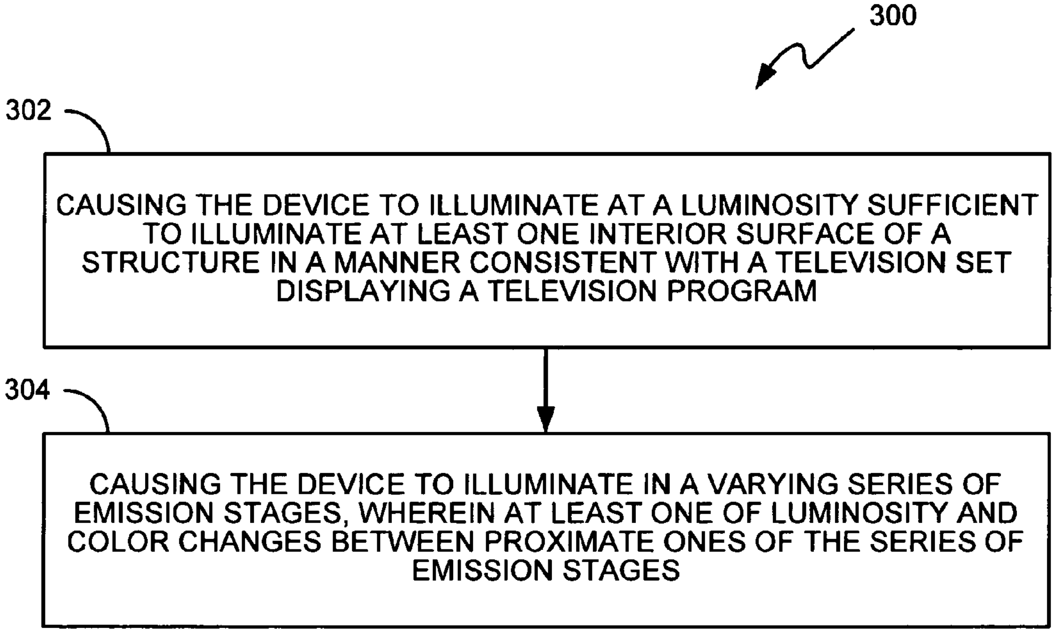
FIG. 3 illustrates one exemplary method of security device operation.

FIG. 3 illustrates exemplary method 300 of security device operation. Method 300 includes steps 302, 304 to 1) causing the device to illuminate at a luminosity sufficient to illuminate at least one interior surface of a structure in a manner consistent with a television set displaying a television program; and 2) causing the device to illuminate in a varying series of emission stages, wherein at least one of luminosity and color changes between proximate ones of the series of emission stages.

What is claimed is:

1. A security device, comprising:

a lighting fixture;

a number of lighting elements, mounted to the lighting fixture; and a control circuit, programmed to vary the luminosity and duration of the drive currents provided to each of the number of lighting elements, in accord with an algorithm embedded in the control circuit;

wherein the algorithm causes the number of lighting elements to undergo a series of abrupt output changes after the device output has remained substantially uniform for a length of time in conformity with scene lengths of a television program.

2. The device of claim 1, wherein the series of abrupt output changes occur sufficiently quickly so as to appear instantaneous to a human observer.

3. The device of claim 1, wherein the series of abrupt output changes occurs in substantially in less than 0.1 seconds.

4. The device of claim 1, wherein the series of abrupt output changes are a series of abrupt luminosity changes.

5. The device of claim 1, wherein the series of abrupt output changes occur after the device output has remained essentially consistent for a duration selected substantially from the range of 1 to 30 seconds.

6. The device of claim 1, wherein the series of abrupt output changes includes at least one substantially zero luminosity level, the zero luminosity level having a duration and occurrence frequency selected in conformity with commercial advertisement breaks in a television programs.

7. The device of claim 1, wherein the series of abrupt output changes includes at least one substantially zero luminosity level.

8. The device of claim 1, wherein ones of the series of abrupt output changes are changes in output color.

9. The device of claim 8, wherein the output color is within a range of colors emitted from a television set.

10. The device of claim 9, wherein the output color has a color temperature greater than 5,500 degrees Kelvin.

11. A method of security device operation, comprising:

causing the device to illuminate at a luminosity sufficient to illuminate at least one interior surface of a structure in a manner consistent with a television set displaying a television program; and causing the device to illuminate in a varying series of emission stages, wherein at least one of luminosity and color changes between proximate ones of the series of emission stages.

12. The method of claim 11, wherein the changes occurs instantaneously as perceived by a human observer.

13. The method of claim 11, wherein the color is selected from color temperatures greater than 5,500 degrees Kelvin.

14. The method of claim 11, wherein the duration of ones of the emission stage is selected substantially from the range of 0.5 to 30 seconds.

15. The method of claim 11, wherein the varying series of emission stages appears random to a human observer.

16. A device for illumination, comprising:

a means for emitting light at a luminosity sufficient to illuminate at least one interior surface of a structure in a manner consistent with a television set displaying a television program; and a means for varying the emitted light in conformity with the emitted light produced by a television displaying a television program.

17. The device of claim 16, wherein varying the emitted light, further comprises, varying the light by instantaneously, as perceived by a human observer, altering at least one of luminosity level and color level.

18. The device of claim 17, wherein the means for emitting light, further comprises, means for emitting light at a color temperature that is greater than 5,500 degrees Kelvin.

* * * * *